United States Patent
Murphy et al.

(10) Patent No.: US 6,176,920 B1
(45) Date of Patent: Jan. 23, 2001

(54) CEMENTITIOUS STRUCTURAL PANEL AND METHOD OF ITS MANUFACTURE

(75) Inventors: Patrick B. Murphy; George Wypych, both of Maple (CA)

(73) Assignee: Smartboard Building Products Inc., Maple (CA)

(*) Notice: Under 35 U.S.C. 154(b), the term of this patent shall be extended for 0 days.

(21) Appl. No.: 09/096,175

(22) Filed: Jun. 12, 1998

(51) Int. Cl.$^7$ .............. C04B 14/38; B32B 5/02; B32B 5/16; B32B 5/24; B32B 13/02

(52) U.S. Cl. .............. 106/711; 106/676; 428/70; 428/312.4; 428/319.1; 428/292.1; 428/294.1; 428/294.7; 428/113; 428/703; 428/193; 264/69; 264/71; 264/257; 264/271.1; 264/333; 264/DIG. 57

(58) Field of Search .................. 106/711, 676, 106/638; 428/70, 312.4, 319.1, 292.1, 294.1, 294.7, 703, 113, 193; 264/69, 71, 333, 257, 258, 279, 308, DIG. 57, 271.1

(56) References Cited

U.S. PATENT DOCUMENTS

| | | | |
|---|---|---|---|
| 1,828,029 | 10/1931 | Marx et al. | |
| 2,355,966 | 8/1944 | Goff. | |
| 3,051,590 | 8/1962 | Proux. | |
| 4,018,619 | 4/1977 | Webster et al. | 106/118 |
| 4,102,700 | 7/1978 | Kwech et al. | 106/100 |
| 4,135,940 | 1/1979 | Peltier | 106/88 |
| 4,159,361 * | 6/1979 | Schupack | 428/703 |
| 4,242,142 | 12/1980 | Gee et al. | 106/97 |
| 4,269,628 | 5/1981 | Ballard et al. | 106/86 |
| 4,306,912 | 12/1981 | Forss | 106/117 |
| 4,329,178 | 5/1982 | Kalvenes et al. | 106/87 |
| 4,338,134 | 7/1982 | Münster | 106/85 |
| 4,373,958 | 2/1983 | Jones et al. | 106/118 |
| 4,407,677 | 10/1983 | Wills, Jr. | 106/97 |
| 4,436,564 * | 3/1984 | Slack et al. | 428/703 |
| 4,539,046 | 9/1985 | McAloon et al. | 106/121 |
| 4,726,713 | 2/1988 | Tallard | 405/267 |
| 4,868,039 | 9/1989 | Lehan | 428/241 |
| 5,268,226 * | 12/1993 | Sweeney | 428/70 |
| 5,350,554 * | 9/1994 | Miller | 264/256 |

FOREIGN PATENT DOCUMENTS 1105623 3/1968 (GB).

* cited by examiner

*Primary Examiner*—Michael Marcheschi
(74) *Attorney, Agent, or Firm*—Burns, Doane, Swecker & Mathis (57) ABSTRACT

The present invention relates to a cementitious structural panel and its method of manufacture. The method of manufacture involves encapsulating a top and bottom layer of porous reinforcing material with a cementitious mixture by vibration. The structural panel may be coated with a layer of waterproof material.

15 Claims, 3 Drawing Sheets

CEMENTITIOUS STRUCTURAL PANEL AND METHOD OF ITS MANUFACTURE

TECHNICAL FIELD OF THE INVENTION

The present invention relates to a waterproof cementitious structural panel which can be used in the construction of residential and commercial buildings and to a method of manufacturing such a panel.

BACKGROUND OF THE INVENTION

Cementitious structural panels have been used in the construction industry to form the interior and exterior walls of residential and/or commercial structures. Typically, the cementitious structural panel has a hardened cement or plaster layer in between layers of a reinforcing or stabilizing material.

Methods of manufacturing such structural panels include casting in specially designed moulds as well as continuous extrusion processes in which the materials are pressed together in the assembly process. These extrusion methods of manufacture are designed for large scale productions which are usually expensive, do not allow for small scale production and cannot be used in remote areas as they need to be near a constant supply of materials.

The methods of manufacture of cementitious structural panels described above allow one to produce a durable wall material which is suitable for construction of both external and internal walls. The cementitious panels have also found applications in interior construction in sections of a building which are exposed to a high relative humidity or water such as floor underboard.

There still remain several drawbacks to this type of panel. Concrete is not a waterproof material and if the panel surface is not waterproofed in some manner it will absorb water at its surface and the absorbed water, at least for typical panels with a thin concrete layer of about 12 mm in thickness, will migrate through the panel and evaporate into the adjacent room or space. Water migration through the panel can wash out soluble salts in the panel and deposit these salts on the panel surface causing efflorescence which affects the appearance of surface of the panel and any coating which was previously applied.

Water migrating through a panel also carries organic materials and deposits them throughout the cross-section of the panel. These organic substances can encourage microbe growth. The growth of microorganisms, once initiated, cannot be easily eliminated and ultimately leads to its gradual deterioration through the gradual loss of the panel's mechanical characteristics, as well as the loss of aesthetic value of the original structure. This process can only be counteracted if water migration is prevented from the moment of panel installation. In order to prevent this migration, cementitious materials require surface protection on the side where microbiological attack may first occur, namely the side which is directly exposed to moisture intrusion. If this protection is not provided, the deposited organic matter will stimulate microorganism growth leading to the previously described loss of mechanical strength and to inferior appearance.

Another important reason for surface waterproofing of such panels is the degradation of the reinforcing material which may be used to improve the strength of the panel. Because of the alkaline nature of cement, the strength of the reinforcing materials can be destroyed over time. Alkaline-resistant coatings may be applied to the reinforcing material but these coatings are not always resistant to microbiological degradation and moreover may not always be effective, as the degradation of the reinforcing material results from the presence of water.

The above concerns are widely shared throughout the construction industry and have resulted in various countermeasures to provide structural panels with waterproof characteristics. For example, urethane elastomers have been sprayed on installed structural panels. Another solution has been to insert a waterproof film into the panel between two layers of concrete material. Alternatively, a sheet made from a thermoplastic resin may be adhered to the surface of the panel. Still others have suggested a silicon rubber sealer composition or a waterproof fibrous plate be used to restrict moisture penetration. Expansive insulating materials have also been used to waterproof and insulate masonry units. Finally, others have attempted to construct an inner layer of concrete, intermediate layer of insulation, and outer waterproofing layer by interconnected hollow passageways, or adhering a rigid layer of insulation or asphalt-elastomer continuing membrane to a cementitious layer by the means of waterproofing adhesive.

Many of the above systems have two disadvantages. The first is that they require a considerable amount of labour. The second is that their performance depends on the skill of the field worker because they are applied at a construction site where only lower precision can be achieved. These systems frequently fail because there is a tendency for contractors to use less than the recommended quantity of material or to use inferior materials since proper materials are generally expensive. In addition, liquid systems have a tendency to settle or separate during storage. If such a system is not properly mixed prior to use, the concentration of active component varies throughout the height of a container in which it is stored causing inconsistent application. Many systems freeze or cannot be applied at certain weather condition which limits field application of these materials. Also, structural panels should be waterproofed immediately after installation to protect them from rain which is not always possible due to work scheduling and uncertain weather conditions.

SUMMARY OF THE INVENTION

The present invention teaches the manufacture of a cementitious structural panel which can be waterproofed.

An aspect of the present invention as described herein is a method of forming a panel comprising the steps of placing a first porous sheet of reinforcing material in a panel mould; dispensing a cementitious mixture into said mould to substantially cover said first sheet, thereby forming a cementitious layer; vibrating said cementitious mixture to embed said first sheet in said cementitious layer; placing a second porous sheet of reinforcing material atop said cementitious layer; vibrating said cementitious mixture to embed said second sheet in said cementitious layer; curing said cementitious mixture so that said cementitious layer substantially solidifies and said cementitious layer, said first sheet and said second sheet form a panel; and removing said panel from said mould.

Another aspect of the present invention as described herein is an apparatus for making a panel comprised of a mould for containing a first sheet of porous reinforcing material; a first dispenser for dispensing a cementitious mixture into said mould to substantially cover said first sheet; a first vibrator for vibrating said cementitious mixture; a second dispenser for dispensing a second porous sheet of reinforcing material from a supply of reinforcing material and layering said second porous sheet atop said cementitious mixture in said mould; a second vibrator for vibrating said cementitious mixture; and a conveyor for transferring said mould between said first dispenser, said first vibrator, said second dispenser, and said second vibrator.

It is an advantage of the present invention to teach a process for constructing a cementitious structural panel which can be waterproofed.

Other features and advantages of the present invention will be apparent from the following description in which the preferred embodiments have been set forth in conjunction with the accompanying drawings.

DETAILED DESCRIPTION OF THE PREFERRED EMBODIMENT

Figure 1:
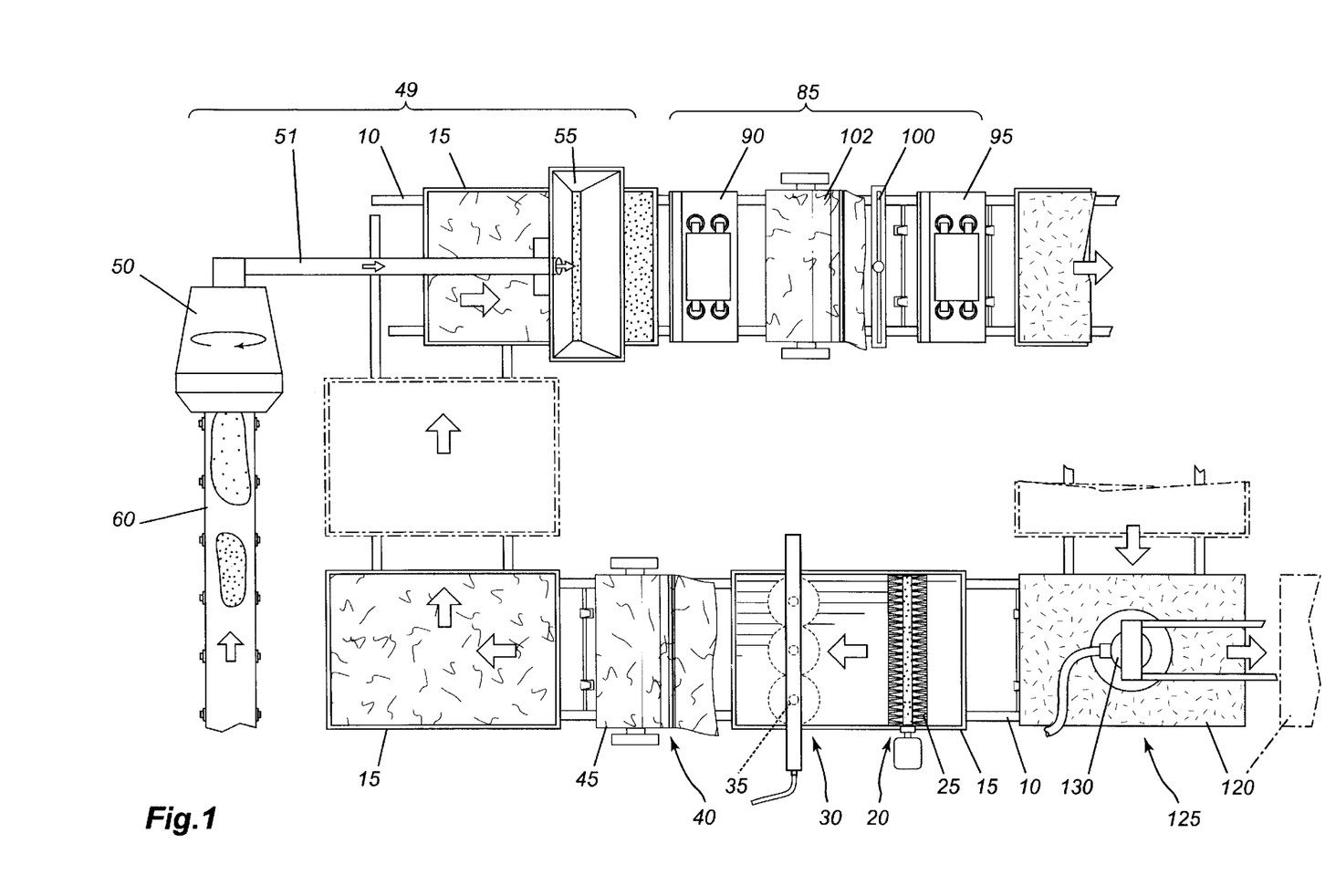
FIG. 1 is a plan view showing a process by which cementitious structural panels are manufactured.
Figure 2:
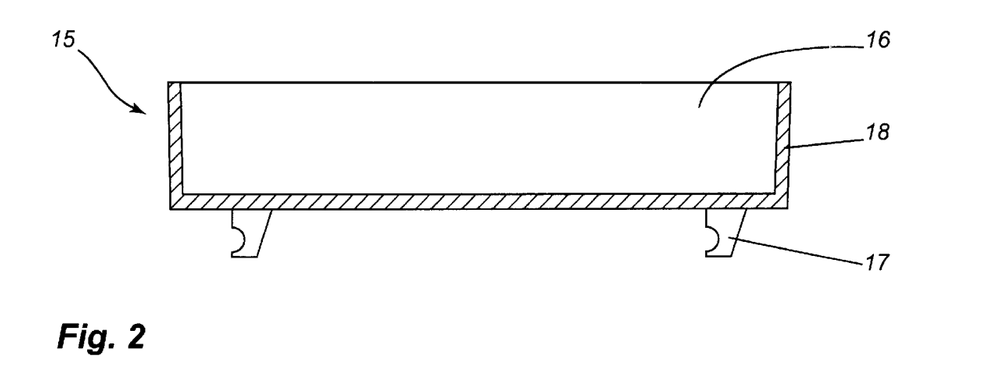
FIG. 2 is a cross sectional view of a structural panel mould.

A production line made in accordance with this invention for producing cementitious structural panels is illustrated in FIG. 1. The line comprises a conveyor 10, along which an open structural panel mould 15 is transported. Such a structural panel mould is detailed in FIG. 2. Structural panel mould 15 is preferably made of stainless steel. However, other materials such as suitable plastics may be utilized. Structural panel mould 15 consists of an interior mould portion 16 which is designed to receive cementitious mixtures and exterior lugs 17 which are designed to engage the conveyor 10. Returning to FIG. 1, a cleaning and preparation station 20 is provided at the upstream end of the conveyor 10 where structural panel mould 15 is cleaned, preferably by a rotary brush apparatus 25, as it passes underneath. The cleaning removes any debris left when a cementitious structural panel 120 (illustrated in FIG. 5) is removed from the mould. Downstream from cleaning and preparation station 20 on conveyor 10 is provided a coating station 30 with sprayers 35. Sprayers 35 apply a coating of releasing agent, preferably a blend of vegetable and mineral oil made by Cresset Chemical, on the interior mould portion 16 of structural panel mould 15. The releasing agent allows for the easy removal of the cured cementitious structural panel 120 by a vacuum lifter described hereinafter.

Figure 5:
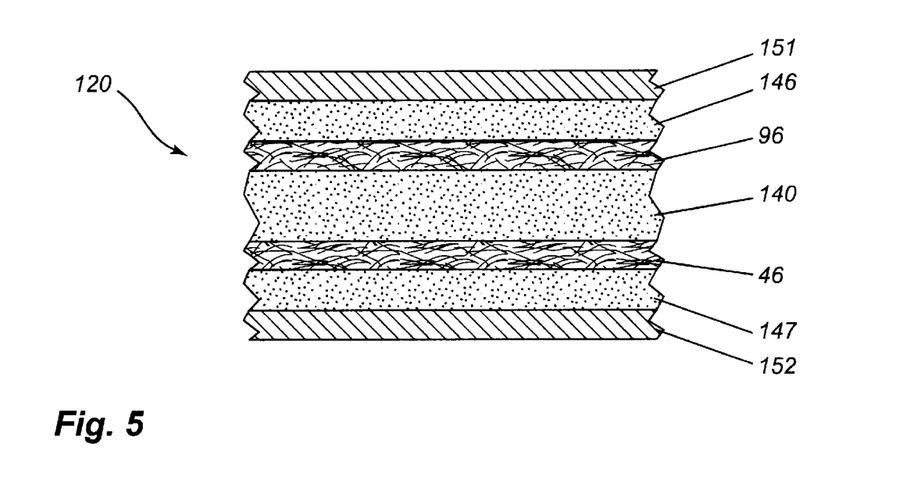
FIG. 5 is a cross section of a cementitious structural panel made in accordance with this invention.

Downstream from coating station 30 on conveyor 10 is a cutting station 40 which contains a supply roll 45 of porous reinforcing material, preferably fibreglass mesh of the kind similar to single-end PVC coated woven glass fabric, manufactured under the trade-mark C. C. by Clark Schwebeltech-Fab Company. The porous reinforcing material can be coated, preferably with PVC, so as to protect it against the effects of the alkaline environment of the cementitious mixture. A segment of the porous reinforcing material (hereinafter referred to as a scrim) is manually measured and cut from supply roll 45 and placed in the interior mould portion 16 of structural panel mould 15, as it passes underneath in order to provide a bottom scrim 46. Such a bottom scrim is illustrated in FIG. 5. Once the bottom scrim 46 has been applied, the structural panel mould 15 is ready to receive a wet cementitious mixture.

After the bottom scrim 46 has been placed into the structural panel mould 15, the conveyor 10 transports the structural panel mould 15 downstream to the cement deposit station 49. The cement deposit station is comprised of a mixer 50 which mixes the ingredients to form a wet cementitious mixture, and a wet mix dispenser 55. The wet cement mixture is comprised of two segments: dry ingredients comprising Portland cement and an aggregate, preferably iron slag aggregate produced by National Slag Limited, and wet ingredients comprising water, and an air entrainment mixture. The composition may typically include aggregate, from 1 to 3 parts by weight; cement, from 0.5 to 2 parts; water, from 0.5 to 1.5 parts, and air entrainment additive from 0.001 to 0.1 parts. Other additives such as superplasticizers, reinforced fibers, and modifying fillers can also be used to improve initial mechanical properties. Low alkali Portland cement Type I or Type II, meeting specifications of ASTM C150, is preferred. Aggregate of the following particle size distribution: 4.75 mm—100% passing; 2.36 mm—75–85% passing; 1.18 mm—45–55% passing; 0.6 mm—20–30% passing; 0.3 mm—10–20% passing; 0.15 mm—6–10% passing is preferred but any other aggregate sizes can also be used. It is preferred that light aggregates are used in accordance with this invention because they decrease the weight of the panel. In turn, such panels impose less weight to the structural elements of a building under construction. At the same time, other aggregates can be used if special mechanical performance is required.

Prior to mixing, the dry ingredients may be stored separately. The water is provided in an auxiliary tank and the air entrainment admixture tank is integrated into the water storage tank. The air entrainment admixture is preferably MB AE® 90, made by Master Builders Inc. However, those skilled in the art will realize that many kinds of air entrainment admixtures are acceptable for the purpose disclosed herein. A pre-determined amount of cement and aggregate are deposited on a conveyor 60 and transported to the mixer 50. The amount of each of the aggregate and the cement will be determined by the requirements for the finished cementitious structural panel 120. Once deposited in the mixer 50 by conveyor 60, the water and admixture flow rates are set and metered into the mixer 50. The noted ingredients are thoroughly intermixed for a predetermined time which will vary between 8–10 minutes depending on the final requirements for the product. Preferably, the wet slurry should have a density of 87 to 88 lbs/cubic ft., however, the density of the mixture may be in the range of 85 to 90 lbs/cubic ft.

Figure 3:
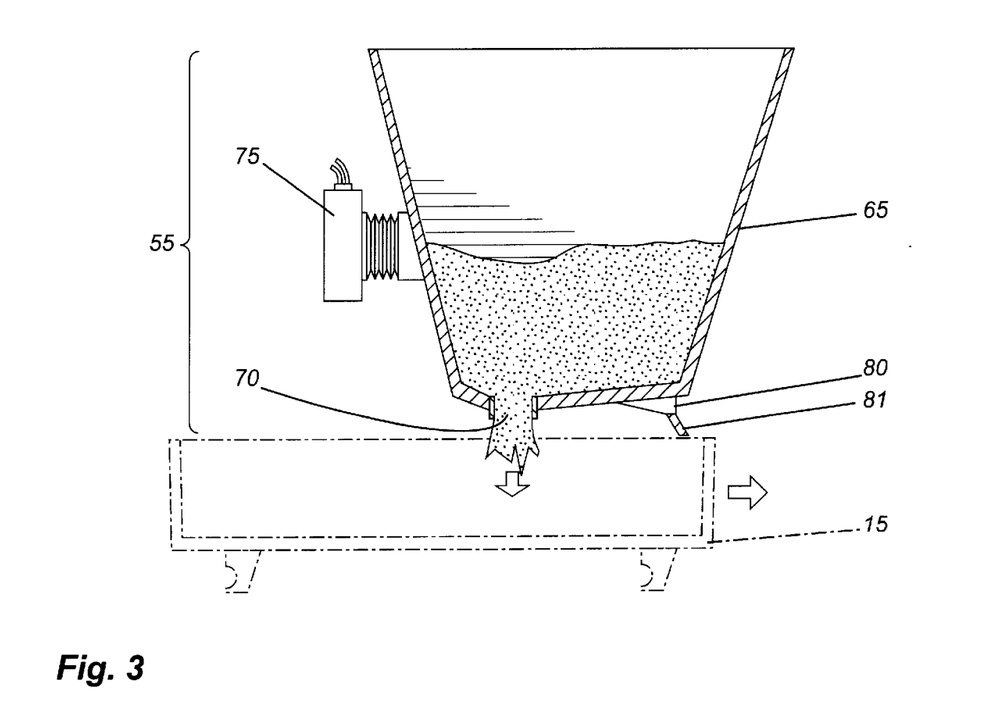
FIG. 3 is a cross sectional view of a portion of FIG. 1.

The wet cementitious mixture is dispensed into the wet mix dispenser 55 through a pipe 51. The wet mix dispenser is detailed in FIG. 3. Turning to FIG. 3, along with FIG. 1, wet mix dispenser 55 comprises a hopper 65 which holds the wet cementitious mixture, an aperture 70 which can be opened and closed through which the wet cementitious mixture is dispensed, a pneumatic vibrator 75 abutting hopper 65 which vibrates the hopper 65, and a levelling or smoothing head apparatus 80. Wet mix dispenser 55 discharges the wet cementitious mixture, at a preset release rate, which in the preferred embodiment is 1.16 cubic feet of mixture/min., but can be as much as 3.0 cubic feet/min. or as little as 0.3 cubic feet/min., into a structural panel mould 15 which is on conveyor 10 immediately underneath the dispenser aperture 70. Sufficient wet mixture is deposited into the interior mould portion 16 of structural panel mould 15 so as to cover the entire interior mould portion 16 of the structural panel mould 15.

The vibrator 75 is connected to hopper 65 such that it vibrates hopper 65 in order to allow the wet cementitious mixture to maintain the characteristics of a "Newtonian Liquid". An ideal Newtonian liquid deforms at a rate which is proportional its viscosity and to stresses applied. By maintaining the Newtonian liquid characteristics of the wet cementitious mixture, the wet cementitious mixture will be sufficiently fluid such that a small amount of force applied to the wet cementitious mixture will induce it to flow. The vibrator 75 vibrates at a rate selected on the basis of the weight of the material (preferably 1 lb. of force to 10 lbs of material for densities up to 90 lbs/cu. ft.). Consequently, the slump rate, or the rate at which the cementitious mixture flows, is high, in the range of 9 inches to 9.5 inches, thus facilitating the wet cementitious mixture's egress from hopper 65 through aperture 70. Located adjacent aperture 70 is smoothing head 80. The smoothing head 80 has an abutment or projection 81 that ensures the wet cementitious mixture is both equally spread out in the internal mould portion 16 of the structural panel mould 15 and level with the sides of the mould 18.

Once the wet cementitious mixture has been deposited into the interior mould portion of the structural panel mould 15, the conveyor 10 transports the structural panel mould 15 downstream to top scrim implanting station 85. The top scrim implanting station is detailed in FIG. 4. The top scrim implanting station 85 consists of two independently controlled screeding and tamping apparatuses 90 and 95, a wetting roller 97 proximate to screeding and tamping apparatus 95, and a shearer 100 located between the two controlled screeding and tamping apparatuses 90 and 95. In between the two screeding and tamping apparatuses, the top scrim 96 is measured and cut by a shearer 100 from supply roll 102. Prior to having the cut and measured top scrim placed on the cementitious mixture, wet roller 97 coats the top scrim 96 with water. The result is that the top scrim 96 coated with water reduces the surface tension of the cementitious mixture. By reducing the surface tension, the embedment of top scrim 96 into the cementitious mixture is facilitated during the screeding and tamping steps described below.

Figure 4:
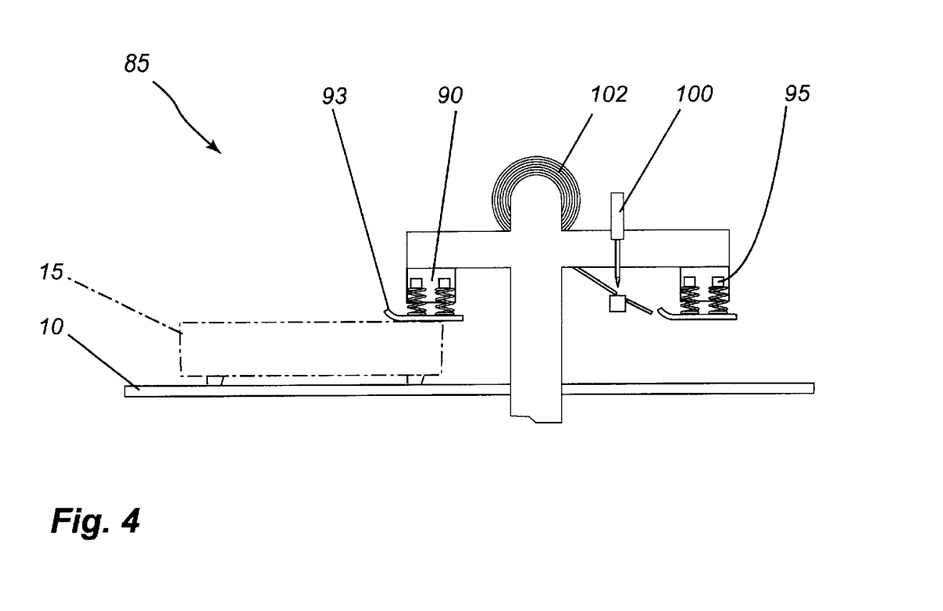
FIG. 4 is a side view of a portion of FIG. 1.

Screeding and tamping apparatuses 90 and 95 are designed to facilitate the embedment of the top and bottom scrims into the top and bottom surface of the cement mixture. Top and bottom scrim placement in the wet mixture is a critical operation in order to obtain an acceptable modulus of rupture (i.e., the flexural strength in the cured panel). Scrim embedment, for both the bottom and the top scrim layer of approximately 1/16 of an inch is ideal in achieving the desired modulus of rupture. However, the degree of penetration of the scrim into the wet cement is determined by the specific requirements of the panel. The first screeder and tamper 90 causes the cementitious mixture within the structural panel mould 15 to vibrate at a predetermined vibrational rate which facilitates the placement of bottom scrim 46 into the wet slurry mixture. The vibrational rate depends on the density of the cementitious mixture. If the density is in the range of 87 to 88 lbs./cubic ft., then the vibrational rate will be set in the range of 3000 to 4000 R.P.M. The pre-set vibration rate, selected for a given cementitious mixture density, induces the bottom scrim 46 to move vertically up into the mix to the preferable depth of 1/16 of an inch. The rate of vibration and the density of the cementitious mixture will determine the depth to which the bottom scrim is implanted. The vibrator has an inclined front end 93 which skims the surface of the wet cementitious mixture to level same. The degree of the inclination of the inclined front end 93 determines the rate at which the cementitious material is spread out in the structural panel mould 15. The greater the angle of the angled portion 93, the greater the rate of spreading of the wet cementitious mix in the structural panel mould 15. Conversely the lesser the angle, the lower the rate of spreading of the wet cementitious mixture.

The second screeder and tamper 95 is set at a different vibrational frequency, selected for a given cementitious mixture density, which has little effect on the bottom scrim 46 but causes the mixture to encapsulate top scrim 96 and to move top scrim 96 downwardly into the mixture. The vibrational rate from screeder and tamper 95 is in a range of between 4000 to 5000 R.P.M. for density range of 87 to 88 lbs./cubic ft. By varying the rate of vibration then the depth of embedment can be determined. However, excess vibration will cause the contents of the wet cementitious mixture to separate out, as well as remove the bubbles produced from the air entrainment mixture. Consequently, the rate of vibration and the duration is important not only from the stand point of the top scrim 96 embedment but for the structure integrity of the structural panel.

Once the top scrim 96 and bottom scrim 46 have been embedded into the wet cementitious mixture, the structural panel mould 15 is lifted onto a skid and transported to a drier (not shown) for curing. Within the drier there is provided a racking system that provides curing for a number of structural panel moulds 15. The curing process involves two steps: hydration and curing. The hydration process involves heating the panel in an environment of approximately 90% humidity, circulating the air, and curing for approximately 8–10 hours. During this curing process, the cementitious mixture preferably retains its alkaline pH. On the contrary, after the final curing step the solidified cementitious mixture is at a neutral pH. It is preferable that the cementitious mixture maintain an alkaline pH before the final curing step because the waterproof coating has an acidic pH. As a result, when the waterproof coating is applied and fully cured, the coating will be significantly more waterproof.

Once cured, the cementitious structural panels 120 (as seen in FIG. 5), while still within the structural panel moulds 15, are transferred to the removal or stripping station 125. The stripping station contains vacuum lifter 130 which affixes to the cementitious structural panel 120 and lifts it out from the structural panel mould 15. By lifting the cementitious structural panel 120 out of the structural panel mould 15, the cementitious structural panel 120 and the structural panel mould 15 are separated. Once separated, the cementitious structural panel 120 can be further treated with a waterproof coating, as described below. The structural panel mould 15 is transferred back to the conveyor 10. Once engaged by the conveyor 10, the structural panel mould 15 is transported to the cleaning and preparation station 20, and the cycle is repeated.

After being removed from the structural panel mould 15, cementitious structural panels 120 can then be treated with a waterproof coating. Each cured cementitious structural panel is kiss- or spray-coated with a waterproofing mixture and cured as required, usually for another 2 days. At the end of this second curing the waterproofed panel is ready for shipment.

The waterproofing coating can be obtained from the compositions including various groups of polymers. The polymers, which can be used for this purpose, include: poly(vinyl chloride) (PVC), polyurethane (PU), acrylic resins (AR), and other polymers which have waterproof properties. Additional examples include polymer-modified bitumens, alkyd resins, epoxy resins (EP), silicone resins which are not discussed below in detail but can also be used within the framework of the present invention. The processing of each resin to form a coating composition requires the use of some specific additives which are discussed for individual polymers below.

A PVC polymer can be any emulsion, suspension, bulk polymerizate in the form of dry particles of water-based dispersion suitable for film forming material. Several different additives are required to process PVC. These additives include: plasticizers, fillers, thermal and UV stabilizers, rheological additives, etc.

Suitable plasticizers are well known in the art and include dioctyl phthalate, dibutyl phthalate, dibutoxyethyl phthalate, diisodecyl phthalate, butylbenzyl phthalate, a partially hydrogenated terpene commercially available as HB-4, various adipates such as dioctyl adipate, dipropylene glycol dibenzoate, dioctyl sebacate, diethyl butyl sebacate, dibutoxyethyl glutarate, didecyl glutarate, diisodecyl glutarate, tricresyl phosphate, tributyl phosphate and still many other materials.

Exemplary filler materials include carbon black, clays, calcium carbonate, surface treated silicas, silicate-containing minerals, such as antigorite, serpentine, hornblends, amphibiles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, asbestos powder, carbon fibers, and the like. This list, however, is not comprehensive and is given merely as illustrative.

Stabilizers typically used include fatty acid salts of Ca, Zn, Ba, Cd, organotin stabilizers, lead stabilizers, and various secondary stabilizers. This list, however, is not comprehensive and is given merely as illustrative.

Many other additives can be used to modify properties of PVC plastificates. They include rheological additives, adhesion promoters, UV stabilizers, impact modifiers, etc. These additives can be used in the present invention.

A typical composition of the polyurethane coating system includes: isocyanates, prepolymers, polyols, chain extenders, curatives, catalysts, fillers, plasticizers, rheological additives, UV stabilizers, and other suitable additives.

Aromatic diisocyanates, such as diphenylmethane-4,4'-diisocyanate, toluene-2,4-diisocyanate, 1,5-naphthalene diisocyanate, 1,3- and 1,4-phenylene-diisocyanate, triphenylmethane-4,4',4''-triisocyanate, polyphenyl-polymethylene-polyisocyanates, and aliphatic or cycloaliphatic diisocyanates, such as hexamethylenediisocyanate, dodecane-1,12-diisocyanate, cyclobutane-1,3-diisocyanate, cyclohexane-1,3- and -1,4-diisocyanate, 1-isocyanato-3,3,5-trimethyl-5-isocyanato-methylcyclohexane, hexahydrotoluene-2,4- and -2,6-diisocyanate, hexahydro-1,3- and -1,4-phenyldiisocyanate, perhydrodiphenylmethane-2,4'- and -4,4'-diisocyanate and their prepolymers can be used in the present invention.

Polyols, having a molecular weight range from 400 to 10,000, preferably from 1,000 to 6,000, such as linear or branched polybutadienes, polycarbonates, polycaprolactones, polycaprolactams, polyethers, including polyethylene oxides, polypropylene oxides, polybutylene oxides, polystyrene oxides, polyepichlorhydrins, polytetrahydrofurans, polyesters, such as condensation products of polyhydric alcohols (e.g., ethylene glycol, 1,2- and 1,3-propylene glycol, 1,4- and 2,3-butylene glycol, 1,6-hexanediol, 1,8-octanediol, glycerin, trimethylol propane, pentaerythritol, chitin, mannitol and sorbitol, methylglycoside, diethylene glycol, polyethylene glycols, dipropylene glycol, polypropylene glycols) with multifunctional carboxylic acids and/or carboxylic acid anhydrides and/or carboxylic esters (e.g., succinic acid, adipic acid, octanedionic acid, azelaic acid, sebacic acid, phthalic acid, isophthalic acid, trimellic acid, phthalic acid anhydride, tetrahydrophthalic acid anhydride, tetrachlorophthalic acid anhydride, glutaric acid anhydride, maleic acid anhydride, fumaric acid, terephthalic acid dimethyl ester and terephthalic acid-bis-glycol ester), each having at least 2 terminal primary and/or secondary OH-groups, are the components of the systems which can be used in the present invention.

Cross-linking agents, such as trimethylolpropane, glycerin, hexanetriol, triethanolamine, sorbitol, mannitol, sucrose, ethyleneamine, ethanolamine, hexamethylene amine, and pentaerythritol are used for curing purposes in the present invention. Also, amines such as ethylenediamine, diethylenetriamine, triethylenetetramine, polyethyleneimine, menthanediamine, monoethanolamine, monobutylamine, phenylenediamine, dichlorodiamino-diphenylmethane and triethylenediamine, polyamides, monovalent and polyvalent carboxylic acids, metal salts of said acids, organic amine salts can be used as curatives in the present invention.

Compounds containing silane groups such as difunctional alkoxysilanes, including (3-aminopropyl) methyldimethoxysilane, (3-aminopropyl) methyldiethoxysilane (3-(N-aminoethyl) aminopropyl) methyldimethoxysilane, (3-mercaptopropyl) methyldimethoxysiane (3-mercaptopropyl) methyldiethoxysilane, and trifunctional alkoxysilanes, including (3-aminopropyl)trimethoxysilane, (3-aminopropyl)triethoxysilane, (3-mercaptopropyl) trimethoxysi lane, (3-mercaptopropyl)triethoxysilane, (3-(N-methylamino)propyl)trimethoxysilane, (3-glycidoloxypropyl)trimethoxysilane are used to improve adhesion in the compositions according to present invention.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds. Tertiary amines such as triethylenediamine, triethylamine, diethylcyclohexylamine, N-ethylmorpholine and diethyl-ethanolamine may also be employed as well as mixtures of any of the above.

Acrylic resins used in this invention can be latex based, of relatively high solids content (40–65%) of monomers such as styrene, butadiene, acrylic acid, acrylic acid esters (particularly methyl acrylate), vinyl acetates, vinyl chlorides and the like latices. These latices are used with various additives such as fillers, pigments, wetting agents, Theological additives, adhesion promoters, antifoaming agents, crosslinkers, etc.

Typical additives used in acrylic resin processing are represented in different groups by: rheological additives: fumed silica, various fillers, microspheres, nonionic associative thickeners, polyurethane-based thickeners, hydroxyethyl cellulose, ammonia; dispersants: potassium tripolyposphate, octylphenoxypolyethoxy ethanol, sodium salt of polymeric carboxylic acid, alkyl sulfate, fluoro compounds; antifoaming agents: proprietary petroleum derivatives, polydimethyl siloxane; adhesion promoters: gamma-glycidoxypropyltrimethoxysilane; coalescents: ethylene butyl monobutyl ether, dipropylene glycol n-butyl ether, diethylene glycol hexyl ether, propylene glycol phenyl ether; crosslinkers: zinc oxide; plasticizers: phthalate esters and other plasticizers similar to the listed above for PVC; solvents, diluents: ethylene glycol, propylene glycol, white mineral oil; fillers: similar to the listed above for PVC. This list, however, is not comprehensive and is given merely as illustrative. The compounds listed here can be used in the current invention.

The above list of chemical components does not include one of the most important additives: biocide. The main representative biocides include barium metaborate monohydrate (sold under the trade-mark Busan 11 -M1, manufactured by Buckman Labs), 2-N-octyl-4-isothiazolin-3-one Vinyzene IT (sold under the trade-mark Skane Morton, manufactured by DOW), 10,10'-oxybisphenoarsine Vinyzene BP (sold under the trademark Morton, manufactured by DOW), silver-hydroxyapatite complex (sold under the trade-mark Apacider, manufactured by Sangi Co. Ltd.), 2,3,5,6-tetrachloro-4(methyl sulphonyl) pyridine (sold under the trade-mark Densi I, manufactured by ICI), 2-(thiocyanomethylthio) benzothiazole (sold under the trade-mark Busan 1030, manufactured by Buckman Labs), N-(trichloromethyl thio)-phthalimide (sold under the trade-mark Fungitrol II, manufactured by Huels) and 3-iodo-2-propynyl butyl carbamate (sold under the trade-mark Polyphase AF-1, manufactured by Troy Chemical). This list is by no means exhaustive but includes some representatives which can be applied according to the current invention to control biodegradative processes.

A finished cementitious structural panel 120 made in accordance with this invention is illustrated in FIG. 5. The finished cementitious structural panel 120 is comprised a layer 140 layer of cement and expanded light weight iron slag aggregate. Two layers of reinforcing material, bottom scrim 46 and top scrim 96, are positioned on either side of layer 140. Two outer layers of cement and expanded light weight iron slag aggregate, 146 and 147 are positioned on either side of the reinforcing material layers 46 and 96. Finally, there are two layers of waterproof coating 151 and 152 positioned on either side of the layers 146 and 147. In many applications, one layer of coating positioned on one side of the panel may be sufficient. Such panels are mounted with the single coating layer facing the source of the moisture.

The examples below are intended to illustrate, but not to limit, the present invention.

EXAMPLE 1

120 kg of light weight aggregate, having particle size distribution as detailed above, was delivered to the mixer together with 60 kg of Portland cement. 50 ml of air entrainment agent was added and the materials in the mixer were mixed with 60 kg of water for 8 min. When the mixing time elapsed, the wet cementitious mixture was dispensed into the wet mix dispenser and deposited into the structural panel mould containing the bottom scrim. While the structural panel mould was moving along the conveyor, a sufficient amount of wet cementitious mixture was deposited into the structural panel mould, over the bottom scrim, in order to obtain a 12 mm thick panel. After top scrim placement and vibration for 30 sec., the pan was transferred for curing. The cementitious mixture in the structural panel mould had an even surface at this point and both scrims where embedded by a layer of about 1 mm on each side. Typical conditions of curing are: temperature 40° C., relative humidity 90%, time 8 h. The structural panel obtained after the curing process was used for further experimental work described in the examples below. For the purpose of these studies, specimens of a sufficient size to conduct an experiment were cut off and processed as discussed in the experiments below.

EXAMPLE 2

500 g of emulsion PVC, having Fickentscher number of 70 was mixed with 350 g of di(2-ethylhexyl) phthalate (DOP), 16 g of calcium-zinc stabilizer, and 4 g of barium metaborate monohydrate. The resultant mixture was a pseudoplastic paste. The resultant paste was coated on the top surface of the panel from the Example 1 by kiss-coating and the material heated in oven for 2 min at 180° C. The resultant specimens were used for testing as described below.

EXAMPLE 3

1000 g of PPG triol (e.g., Pluracol 220 from BASF) and 240 g of 4,4'diphenylmethane diisocyanate (MDI) were loaded to a glass reactor under the constant flow of nitrogen. Under vigorous mixing, the temperature was increased to 70° C. and the mixture kept at this temperature for 1 h. At this point, 0.1 g of dibutyl tin dilaurate was added and temperature of the mixture was increased to 90° C. The mixture was kept at this temperature until the concentration of isocyanate was reduced to the half of the initial concentration. 40 g of barium metaborate monohydrate was mixed into the resultant mixture. The resultant mixture was kiss-coated on the top surface of the panel from Example 1 and the material left for curing at ambient conditions for 2 days. The resultant specimens were used for testing as described below.

EXAMPLE 4

70 g water, 20 g ethylene glycol, 0.8 g Tamol 850, 0.4 g potassium tripolyphosphate, 0.8 g Nopco NXZ, 23 g titanium dioxide, 48 g calcium carbonate, 4 g zinc chloride, and 6 g silicon oxide were mixed in a high speed disperser for 10 min. 1 g Triton X-405, 150 g Rhoplex 2438, 0.4 g Nopco NXZ, 0.6 g Skane M-8, 2 g Natrosol 250HR, 3 g water were added while mixing in high speed disperser and the mixing continued for 10 min. Finally, the pH was regulated with ammonia to 8.3 and the resultant mixture, which was a viscous paste, was used for coating. The resultant paste was coated on the top surface of the panel from Example 1 by kiss-coating and the material left for curing at ambient conditions for 2 days. The resultant specimens were used for testing as described below.

EXAMPLE 5

First, droplets of water were placed on the surface of the specimens obtained according to Examples 1 to 4. A droplet of water placed on the surface of a specimen from Example 1 immediately spread on the surface of the material and within a short period of time it was absorbed into the material. In similar processes, droplets of water were placed on the surfaces of specimens from Examples 2 to 4. In this case, the droplets did not readily wet the surface but remained in an initial form of droplets, having contact angles characteristic of the coating materials for specimens prepared according to the Examples 2 and 3. This experiment shows that there is a difference between the behaviour of these two coated concrete panels and the uncoated panel. The specimen prepared according to the Example 4 did not behave in the same manner as other two coated specimens. Water droplets spread on the surface in a thin layer. At the same time there was no indication that water was absorbed into the concrete part of the panel. While the uncoated material absorbs all the water, the coated specimens do not have any affinity to water and the coatings protect the surface sufficiently to prevent it from absorbing water. The difference in the behaviour between coated samples can be probably explained by the presence in the acrylic coated specimen of several components which are designed to reduce surface tension which change contact angle but do not seem to affect water absorption. In addition, acrylic resins are highly polar which also affects interaction with water.

Then, the same amounts of water (0.5 g) were placed on the surfaces of all specimens and each specimen was placed in a container over a layer of water at the bottom of the container. Each container with its contents was hermetically closed, weighed, and left for 24 hours. After 24 hours, water was still visible on the surface of specimens prepared according to the Examples 2 to 4 whereas all the water was absorbed into the specimen prepared according to the Example 1. The specimens in the containers were weighed again and it was confirmed that all specimens were hermetically closed because no weight loss was noted. Next, the water from the surface of the specimens was wiped off with absorbing tissue and the specimens together with the container were weighed again. It was discovered that the weight of the specimen prepared according to the Example 1 was not changed whereas the specimens prepared according to the Examples 2, 3 and 4 had the following weight loss: 0.4915, 0.489, 0.478 g, respectively. This means that the specimens prepared according to the examples 2, 3, and 4 absorbed 1.7, 2.2, and 4.4% water, respectively, which is characteristic of the films made out of the coatings used. This experiment shows that all three coated specimens have sufficient repelling qualities to prevent water from migrating through the thickness of concrete panel. This experiment also confirms that material with coating will overcome difficulties experienced with uncoated panels.

It was surprising to discover that in the case of acrylic coating from Example 4, water absorption was below the level typically expected from acrylic resin compositions (more than 7%). It is not possible to explain this finding by the existing theory but the unexpected finding seems to indicate that application of coating on the material which was not exposed to excessive moisture gives better results. This finding may suggest that in-plant application may provide some other benefits in addition to the uniform coating obtained under controlled conditions as previously thought.

The addition of biocide to the formulation makes these coatings resistant to microbiological attack. It also provides protection to the entire panel finished by such coating. It is known from the tests of these compositions that the action of these biocides offers long-term protection and it substantially reduces the potential of biodegradation. No growth of test microorganisms was observed when test specimens of similar coatings were exposed to a variety of test species.

Further modification and variation can be made to the disclosed embodiments without departing from the subject and spirit of the invention as defined in the following claims. Such modification and variations, as included within the scope of these claims are meant to be considered part of the invention as described.

What is claimed is:

1. A method of forming a panel comprising:

(a) placing a first porous sheet of reinforcing material in a panel mould;

(b) providing a cemenetitious mixture and dispensing said cementitious mixture into said mould to cover said first sheet, thereby forming a cementitious layer;

(c) vibrating said cementitious mixture to fully encapsulate said first sheet in said cementitious layer, said cementitious mixture having a wet density which facilitates full encapsulation of said first sheet when said cementitious mixture is vibrated.

(d) placing a second porous sheet of reinforcing material atop said cementitious layer;

(e) vibrating said cemenetitious mixture to fully encapsulate said second sheet in said cementitious layer;

(f) curing said cmentitious layer so that said cementitious layer, said first sheet and said second sheet form a panel; and (g) removing said panel from said mould.

2. The method of claim 1 wherein said cementitious mixture has a wet density between 87 to 88 lbs/cubic ft.

3. The method of claim 2 further comprising:

(h) coating said panel with a waterproof layer to form a coated panel; and (i) oven curing said coated panel to form a waterproof panel.

4. The method of claim 3 wherein step (h) comprises coating said panel with said waterproof layer while said cementitious layer has an alkaline pH.

5. The method of claim 4, wherein said reinforcing material is poly(vinyl chloride) coated fibreglass mesh.

6. The method of claim 1, wherein step (c) comprises vibrating cementitious mixture sufficiently so that said cementitious mixture has a Newtonian flow when dispensed.

7. The method of claim 6, wherein step (c) comprises vibrating said cementitious mixture to move said first sheet upward into said cenientitious layer to fully encapsulate said first sheet in said cementitious layer.

8. The method of claim 7, wherein step (e) comprises vibrating said cementitious to move said second sheet downward into said cementitious layer to fully encapsulate said second sheet in said cementitious layer.

9. The method of claim 2, wherein step (c) comprises vibrating said cementitious mixture at a frequency between 3000 to 4000 R.P.M, for a duration of 30 seconds.

10. The method of claim 2, wherein step (c) comprises vibrating said cementitious mixture at a frequency of 3000 R.P.M., for a duration of 30 seconds.

11. The method of claim 9, wherein step (e) comprises vibrating said cementitious mixture at a frequency between 4000 to 5000 R.P.M., for a duration of 30 seconds.

12. The method of claim 10, wherein step (e) comprises vibrating said cementitious mixture at a frequency of 4000 R.P.M., for a duration of 30 seconds.

13. The method of claim 3, wherein step (h) comprises coating the panel with a polymer solutions.

14. The method of claim 13, wherein said polymer solution comprises one of a poly(vinyl chloride), polyurethane or acrylic resin.

15. The method of claim 14, wherein said polymer solution comprises a plasticizer, filler and stabilizer.

* * * * *

UNITED STATES PATENT AND TRADEMARK OFFICE
CERTIFICATE OF CORRECTION

PATENT NO. : 6,176,920 B1  
DATED : January 23, 2001  
INVENTOR(S) : Murphy et al.

Page 1 of 1

It is certified that error appears in the above-identified patent and that said Letters Patent is hereby corrected as shown below:

<u>Column 12,</u>  
Line 6, delete "cemenetitious" and insert -- cementitious --.  
Line 16, delete "cemenetitious" and insert -- cementitious --.  
Line 20, delete "cmentitious" and insert -- cementitious --.  
Line 41, delete "cenientitious" and insert -- cementitious --.  
Line 60, delete "solutions" and insert -- solution --.

Signed and Sealed this

Twenty-first Day of May, 2002

Attest:

JAMES E. ROGAN  
*Attesting Officer*     *Director of the United States Patent and Trademark Office*